April 12, 1966 K. R. LEWIS 3,245,455
TUBELESS TIRES
Filed April 20, 1964
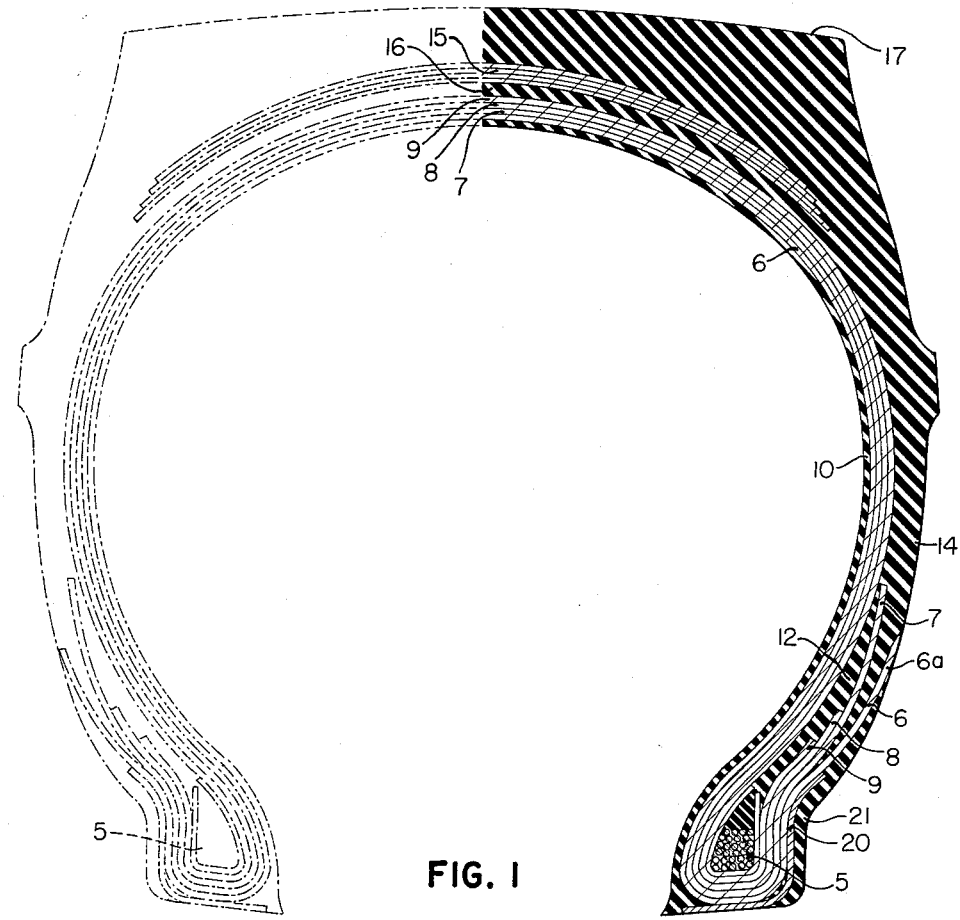
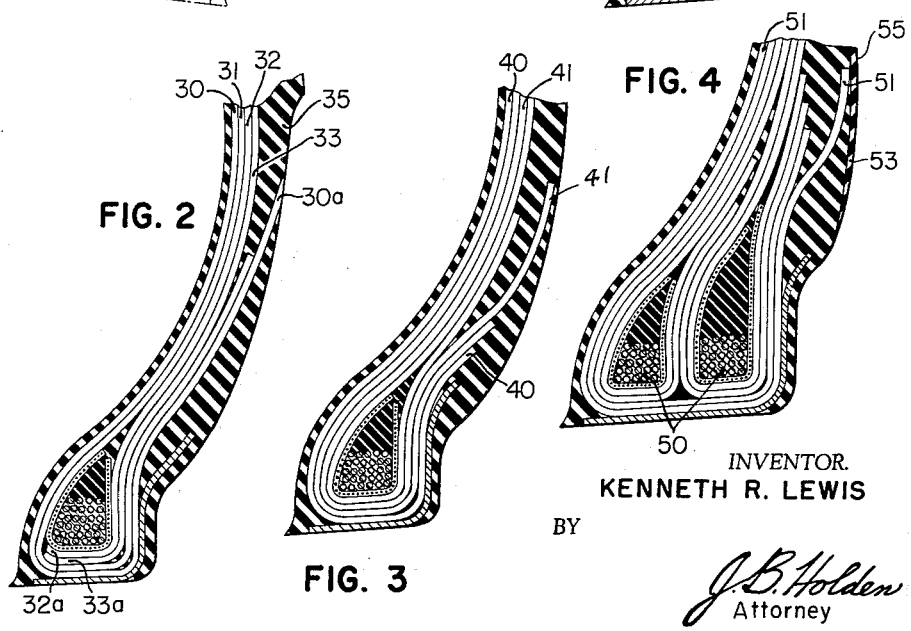
INVENTOR.
KENNETH R. LEWIS
BY
J. B. Holden
Attorney

United States Patent Office 3,245,455
Patented Apr. 12, 1966

3,245,455
TUBELESS TIRES
Kenneth R. Lewis, Akron, Ohio, assignor to The Goodyear Tire & Rubber Company, Akron, Ohio, a corporation of Ohio
Filed Apr. 20, 1964, Ser. No. 361,075
2 Claims. (Cl. 152—356)

This invention relates to a new tubeless tire and it is most advantageously employed in connection with a tire the plies of which are reinforced with cords of large diameter as, for example, cords measuring .060 to .190 inch in diameter. These cords are preferably composed of nylon or polyester, but they may be rayon, cotton or other fabric.

One objection to the use of cords of large diameter has been that in tubeless tires they facilitate the wicking of air from the interior of the tire to the cord ends at the outer surface of the tire causing separation, and this is particularly true of tires which are inflated under high pressure such as 50 pounds or more, such as aircraft tires, truck tires, off-the-road tires, etc.

According to this invention, one of the plies reinforced with large cords, and preferably one of the innermost plies, after being turned up around the bead, terminates adjacent the outer wall of the tire so that air which enters the cord and is wicked through the cord to the outer portion of the tire is released adjacent the outer surface of the sidewall of the tire instead of being released under the sidewall, as it would be if the plies were all tied into the tire in the usual manner.

Although generally, according to this invention, one of the large-cord plies (and generally the innermost such ply) terminates adjacent the outer surface of the sidewall of the tire, and there is no covering over the sidewall. An air-pervious weather-protecting strip which does not prevent the venting of air from this ply may be applied over the sidewall of the tire. This strip may be relatively narrow and cover only the area adjacent the edge of this large-cord ply, or it may extend over most or all of the sidewall of the tire. This strip may, for instance, be vented by small perforations in at least the portion which covers the edge of the large-cord ply. Alternatively this weather-protecting strip may be composed of an air-pervious rubber compound such as one in which cotton flock or the like is compounded with the rubber. It need not be of rubber, but may be of other flexible plastic. Thus, reference herein to the edge of a large-cord ply terminating adjacent the outer surface of the sidewall does not preclude the possibility that this sidewall is covered with an air-pervious weather-protecting strip, at least in the area adjacent the edge of the large-cord ply. This weather-protecting strip may be applied at any suitable stage in the manufacture of the tire.

The tire may include one or more radial plies, or two or more bias plies. If there is more an one carcass ply, one or more of them may be turned down—that is, they may terminate interiorly of the bead, either terminating at the inner edge of the bead or being turned up over its inner surface, whereas one or more other plies are turned up—that is, they terminate exteriorly of the bead. According to the invention, there is one turned-up ply which terminates adjacent the outer surface of the sidewall of the tire.

The invention is further described in connection with the accompanying drawings, in which FIGURE 1 is a section through a four-ply tire each of the plies being turned up and the innermost ply terminating at the wall of the tire;

FIGURE 2 shows only a part of a section through a tire in which there are four plies, two of which are turned down and two of which are turned up;

FIGURE 3 shows only a part of a section of a tire similar to that shown in FIGURE 1, but with one of the outer plies terminating at the wall of the tire; and FIGURE 4 shows only a part of a section of a dual-bead tire with one of the plies terminating at the wall of the tire.

The tires of FIGURES 1 to 3 comprise a single bead 5 of any usual construction. The four plies 6, 7, 8 and 9 of the tire of FIGURE 1 are all turned up around the bead. These are advantageously all nylon or polyester. The edge 6a of the inner ply terminates adjacent the outer surface of the sidewall of the tire. The second ply 7, which may be wider or narrower than the ply 6, is shown as terminating adjacent the bead-to-bead portion of the various plies and, more particularly, the bead-to-bead portion of the outermost ply 9. The edges of the plies 8 and 9 are shown as terminating short of the ply 7, although their endings might be in any other usual order.

In building up the carcass of this tire, the air-impervious liner 10 is first placed on the drum and then the inner ply 6. This ply is reinforced with large cords about .070 inch in diameter. These cords are usually about .070 to .125 inch in diameter, but may be .060 to .190 inch in diameter, or thereabouts. The ply 6 is a bias-cut ply, and the ply 7 which is also bias cut and reinforced with identical cords, is next placed on the drum with the cords at an angle to the cords in the ply 6. The plies 8 and 9 are also bias-cut plies. Alternatively, the plies 6, 7, 8 and 9 may be radial plies. The plies 8 and 9 comprise cords which may be the same size as the cords 6 and 7, or smaller. They are placed on top of the ply 7. The beads are then put in place. Before turning up any of the plies the gum apex 12 or a flipper or the like is put in place. Then the edges of the plies 9, 8 and 7 are turned up. The sidewall rubber 14 is then put in place and its lower edge separates the ply 6 from the ply 7. Breakers 15 may or may not be used, and they may be positioned at any suitable stage in the building up of the tire. Cushion stock 16 may separate the breaker from the carcass and the tread 17 will be applied in the usual manner.

The chafer strips 20 and 21 are put in place. The tire is then shaped and vulcanized in the usual manner. The large nylon cords of the inner ply 6 all terminate adjacent the outer surface of the tire. Air which penetrates the liner 10 and enters the ply 6 is wicked through the cords which reinforce this ply and is released at the ends of the cords adjacent the outer surface of the tire. This prevents the difficulties commonly experienced with tubeless tires constructed with large cords the edges of which are tied into the bead-to-bead portions of the carcass plies. In such usual construction, the air which wicks through the cords is released adjacent the bead-to-bead portions of the plies and causes blisters, separations, etc. Most or all of the air which permeates the liner 10 will be wicked through the cords in the ply 6. No substantial amount of air is released from the ends of the cords in the ply 7.

In FIGURE 2 the two inner plies 30 and 31 are turned up. The two outer plies 32 and 33 are brought down around the outside of the bead and turned in, and terminate at 32a and 33a between the bead and the ply 31. The edge 30a of the inmost ply terminates adjacent the outer wall of the tire. The edge of the sidewall 35 separates the edge of the ply 30 from the ply 33. It also separates the edge of the ply 31 from the ply 33 although this is not essential to wicking any escaping air through the outer wall of the tire because most of the entrapped air is wicked through the ply 30 and there is little, if any, that is wicked through the ply 31.

The tire of FIGURE 3 is a four-ply tire. In this tire, it is not the innermost carcass ply which is used to release the internal tire carcass pressure to a satisfactory operating limit, but one of the middle plies. Therefore, it is not the No. 1 ply 40 which ends adjacent the outer wall of the tire for escape of the wicked air, but the No. 3 ply 41. The edge of this ply 41 is covered with a layer of rubber which protects the reinforcement from the weather and is not thick enough to interfere appreciably with the release of wicked air to the atmosphere.

The tire of FIGURE 4 is shown with dual beads 50. It may be the innermost ply 51 which terminates adjacent the outer surface of the sidewall 55 of the tire, as shown, or it may be any of the other inner plies. A weather-protecting cover strip 53 of any air-pervious composition covers the area of the sidewall adjacent the edge of the ply 51.

Although it is not necessary that it be the innermost ply that terminates near the outer surface of the tire, it is desirable that this be one of the inner plies rather than one of the outer plies. If desired, two of the plies may terminate near the outer surface of the tire rather than just one, as shown.

The invention is covered in the claims which follow.

What I claim is:

1. A tubeless pneumatic tire which includes a generally torroidal carcass which comprises at least one rubberized ply containing cords of filamentary material substantially .060 to .190 inch in diameter, the edges of one ply being turned up around the respective beads and extending above the beads so that the ends of the cords in this ply are outside of the bead-to-bead portion, said ply edges being adjacent the outer surface of the sidewall of the tire so that air wicked through the cords in said ply, from within the tire, is released from the tire through the cord ends adjacent the outer surface of the sidewall of the tire, said ply edges being covered with an air-pervious weather-protecting strip.

2. A tubeless pneumatic tire which includes a generally torroidal carcass which comprises a rubber sidewall and rubber plies reinforced with cords of filamentary material substantially .060 to .190 inch in diameter, one of the inner of said plies being turned up around the bead with the edge thereof terminating adjacent the outer surface of the sidewall of the tire, the edge of the sidewall separating said ply edge from the edge of the next adjacent inner ply.

References Cited by the Examiner
UNITED STATES PATENTS

| | | | |
|---|---|---|---|
| 2,031,560 | 2/1936 | Day. | |
| 2,056,012 | 9/1936 | Madge et al. | 142—355 |
| 3,077,915 | 2/1963 | Weber | 152—355 |
| 3,101,110 | 8/1963 | Vandenberg | 152—357 |

ARTHUR L. LA POINT, *Primary Examiner.*

C. W. HAEFELE, *Assistant Examiner.*